(12) United States Patent
Wu et al.

(10) Patent No.: US 8,310,633 B2
(45) Date of Patent: Nov. 13, 2012

(54) LIQUID CRYSTAL DISPLAY HAVING PARTICULAR BIAXIAL COMPENSATION PLATE

(75) Inventors: Yi-Chun Wu, Hualien County (TW); Yu-Chen Liu, Taipei (TW); Chun-Chi Chi, Taichung County (TW)

(73) Assignee: Wintek Corporation, Taichung (TW)

( * ) Notice: Subject to any disclaimer, the term of this patent is extended or adjusted under 35 U.S.C. 154(b) by 254 days.

(21) Appl. No.: 12/897,772

(22) Filed: Oct. 4, 2010

(65) Prior Publication Data
US 2011/0080546 A1   Apr. 7, 2011

(30) Foreign Application Priority Data

Oct. 6, 2009  (TW) .............................. 98133828 A (51) Int. Cl.
*G02F 1/1335* (2006.01)
*G02F 1/1337* (2006.01)

(52) U.S. Cl. ........................ 349/117; 349/118; 349/130

(58) Field of Classification Search .................. 349/117, 349/118, 130
See application file for complete search history.

(56) References Cited

U.S. PATENT DOCUMENTS

| 7,474,370 B2* | 1/2009 | Jang et al. ..................... 349/119 |
| 8,179,508 B2* | 5/2012 | Sakai ............................. 349/119 |
| 8,203,675 B2* | 6/2012 | Yanai et al. .................... 349/117 |

* cited by examiner

*Primary Examiner* — Mike Qi
(74) *Attorney, Agent, or Firm* — Jianq Chyun IP Office (57) ABSTRACT

A liquid crystal display (LCD) including a LCD panel, a first polarizer and a second polarizer respectively disposed at two sides of the LCD, a first a-plate and a second a-plate disposed between the polarizers and LCD panel, a biaxial compensation plate and a c-plate is provided. The biaxial compensation plate is disposed between one of the polarizers and one of the a-plates. The main axis refractive indexes $n_x$, $n_y$, and $n_z$ of the biaxial compensation plate satisfy the formula of $Nz=(n_x-n_z)/(n_x-n_y)$, wherein $n_x>n_y$, and $-0.5<Nz<1$. The first c-plate is disposed between one of the a-plates and LCD panel. The LCD of the present invention is capable of widening viewing angles and enhancing display quality.

10 Claims, 7 Drawing Sheets

LIQUID CRYSTAL DISPLAY HAVING PARTICULAR BIAXIAL COMPENSATION PLATE

CROSS-REFERENCE TO RELATED APPLICATION

This application claims the priority benefit of Taiwan application serial no. 98133828, filed on Oct. 6, 2009. The entirety of the above-mentioned patent application is hereby incorporated by reference herein and made a part of this specification.

BACKGROUND OF THE INVENTION

1. Field of the Invention

The present invention relates to a display apparatus, and more particularly, to a liquid crystal display (LCD) having a vertical alignment liquid crystal layer.

2. Description of Related Art

Since the liquid crystal display is limited by its principle of light emission, there remain some problems that urgently need mitigating. For instance, the range of the viewing angle in the liquid crystal display is too narrow. When a user views the liquid crystal display using a too large viewing angle, the display quality, such as contrast ratio, color saturation and luminance, is then lowered and is not as good as during normal viewing.

Figure 1A:
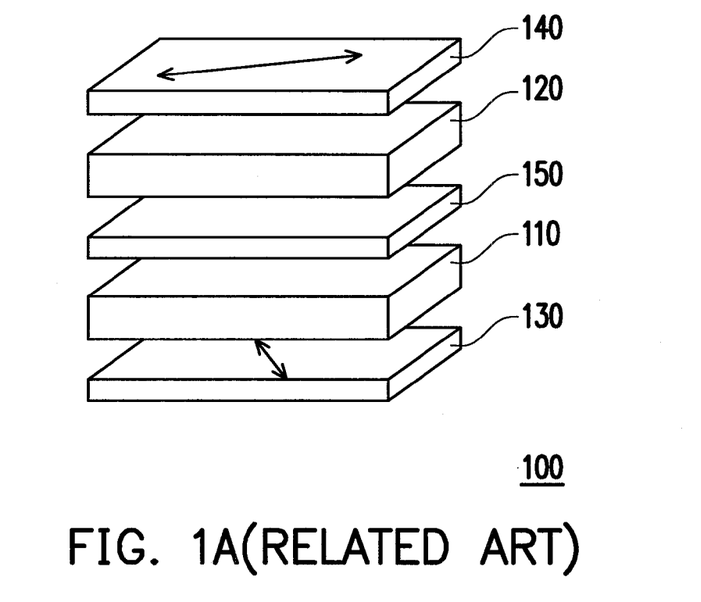
FIG. 1A is a schematic view showing the structure of a conventional vertical alignment liquid crystal display.

FIG. 1A is a schematic view showing the structure of a conventional vertical alignment liquid crystal display. Referring to FIG. 1A, this vertical alignment liquid crystal display (LCD) 100 mainly includes a thin film transistor (TFT) array substrate 110, a color filter (CF) substrate 120, a first polarizer 130, a second polarizer 140, and a vertical alignment liquid crystal layer 150.

Referring to FIG. 1A, the TFT array substrate 110 is disposed on the first polarizer 130, and the color filter substrate 120 is disposed over the TFT array substrate 110. The second polarizer 140 is disposed on the color filter substrate 120, and the vertical alignment liquid crystal layer 150 is disposed between the TFT array substrate 110 and the color filter substrate 120. The liquid crystal molecules in the vertical alignment liquid crystal layer 150 are rotated to different degrees according to the voltage difference between the TFT array substrate 110 and the color filter substrate 120, so that the vertical alignment liquid crystal display 100 displays images.

In order to enhance the display quality of the vertical alignment liquid crystal display, some optical films are added to further increase the viewing angle of the liquid crystal display.

Figure 1B:
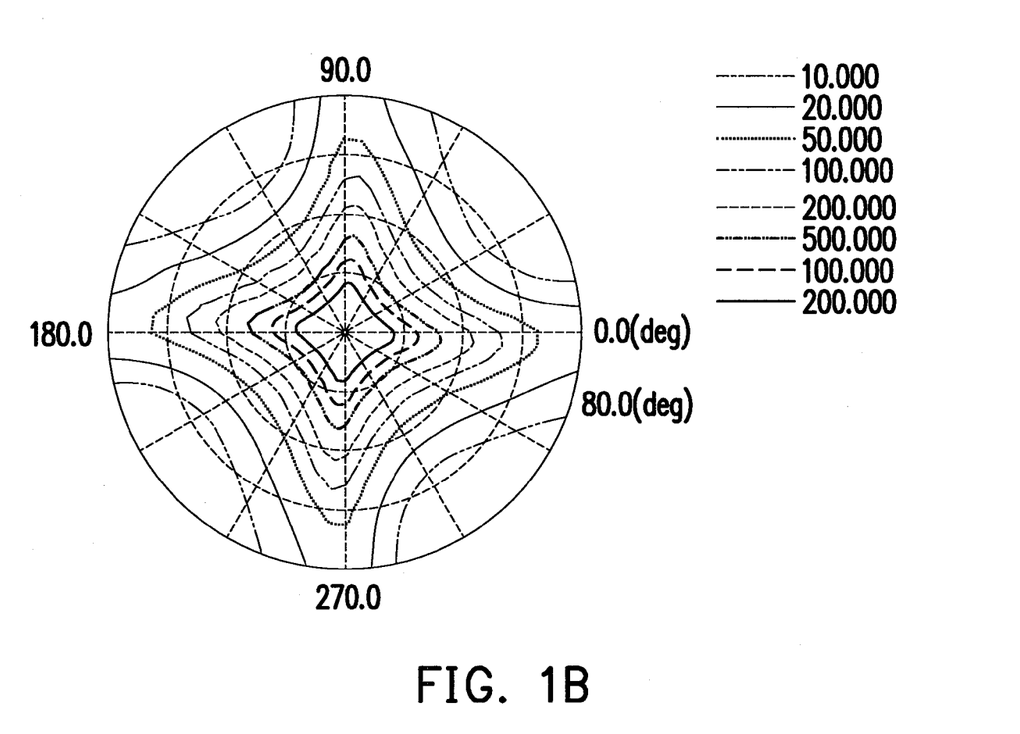
FIG. 1B is a schematic view showing the viewing angle-contrast of a conventional vertical alignment liquid crystal display.

FIG. 1B is a schematic view showing the viewing angle-contrast of a conventional vertical alignment liquid crystal display. Referring to FIG. 1B, the viewing angles in the base directions, such as top direction, bottom direction, left and right directions, of the vertical alignment liquid crystal display can be enhanced through the addition of optical films. However, as shown in FIG. 1B, since the viewing angle in the diagonal direction of the display surface still remains unsatisfactory, the conventional vertical alignment liquid crystal display still leaves much room for improvement. Therefore, how to entirely widen the viewing angles in any direction of the vertical alignment liquid crystal display to enhance the display quality thereof has become a major concern of the liquid crystal display.

SUMMARY OF THE INVENTION

The present invention provides a liquid crystal display to entirely enhance the viewing angle and the display quality thereof by using a biaxial compensation plate.

The present invention provides a liquid crystal display includes a liquid crystal display panel, a first polarizer, a second polarizer, a first a-plate, a second a-plate, a biaxial compensation plate and a c-plate. The LCD panel has a vertical alignment liquid crystal layer. The first polarizer and the second polarizer are respectively disposed on two sides of the LCD panel. The first a-plate is disposed between the LCD panel and the first polarizer, and the second a-plate is disposed between the LCD panel and second polarizer. The biaxial compensation plate is disposed between the first a-plate and the first polarizer or disposed between the second a-plate and the second polarizer, wherein the biaxial compensation plate has a plurality of main axis refractive indexes $n_x$, $n_y$ and $n_z$, and the main axis refractive indexes $n_x$, $n_y$ and $n_z$ satisfy the formula of $Nz=(n_x-n_z)/(n_x-n_y)$, wherein $n_x>n_y$, and $-0.5<Nz<1$. The first c-plate is disposed between the LCD panel and the first a-plate or disposed between the LCD panel and the second a-plate.

In one embodiment of the present invention, the above first c-plate provides a first phase retardation in vertical direction, and the first phase retardation in vertical direction $R_{th}$ is substantially 215 nanometers (nm)±100 nm, for example.

The liquid crystal display of the preset invention has a biaxial compensation plate satisfying a certain condition, such that the phase of incident light after passing through the LCD panel can be adjusted accordingly, and thus color shift phenomenon can be avoided. Accordingly, the liquid crystal display of the present invention can widen the viewing angle and enhance the display quality thereof.

In order to make the aforementioned and other objects, features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The LCDs of the present invention compensate the optical performance of the light passing through the vertical alignment liquid crystal layer by utilizing a biaxial compensation plate satisfying a certain condition. The light passes through the biaxial compensation plate satisfying a certain condition between the main axis refractive indexes so as to obtain an optical performance of widening viewing angle.

First Embodiment

Figure 2A:
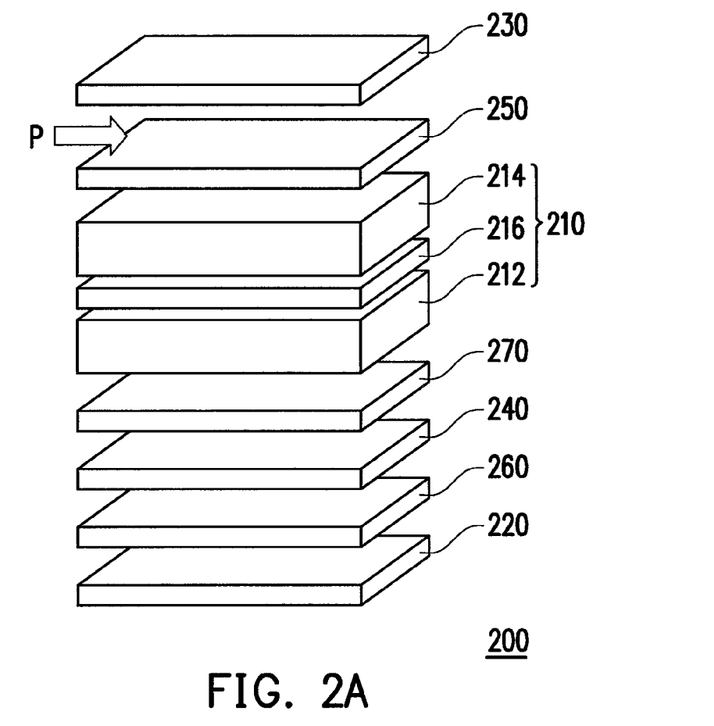
FIG. 2A illustrates a schematic view of a liquid crystal display according to the first embodiment of the present invention.

FIG. 2A illustrates a schematic view of a liquid crystal display according to the first embodiment of the present invention. Referring to FIG. 2A, the LCD 200 of the present embodiment includes a LCD panel 210, a first polarizer 220, a second polarizer 230, a first a-plate 240, a second a-plate 250, a biaxial compensation plate 260 and a c-plate 270. The LCD panel 210 is mainly composed of a TFT array substrate 212, a color filter substrate 214, and a vertical alignment liquid crystal layer 216 sandwiched between said two substrates 212 and 214. Due to the intrinsic optical anisotropy of the liquid crystal molecules in the vertical alignment liquid crystal layer, the whole display performance of the LCD may be affected. This invention utilizes the biaxial compensation plate 260 incorporated with the first a-plate 240, the second a-plate 250 and the first c-plate 270 to compensate the phenomena of viewing angle limit, the color shift, or the light leakage due to the optical anisotropy of the liquid crystal molecules in the vertical alignment liquid crystal layer 216, so as to obtain effects of widening the viewing angle, improving color shift phenomenon, and reducing light leakage phenomenon. In the present embodiment, the phase retardation of the vertical alignment liquid crystal layer 216 is substantially in a range 340 nm±100 nm.

More specifically, as shown in FIG. 2A, the first polarizer 220 and the second polarizer 230 are respectively disposed at two sides of the LCD panel 210. The first polarizer 220 and the second polarizer 230 have a polarizing axis, respectively. When a light passes through the first polarizer 220 or the second polarizer 230, the polarizing direction of the light is rotated along the polarizing axis and renders the light as a polarized light. The first a-plate 240 is disposed between the LCD panel 210 and the first polarizer 220, and the second a-plate 250 is disposed between the LCD panel 210 and the second polarizer 230. In this embodiment, the first a-plate 240, the biaxial compensation plate 260 and the first c-plate 270 are disposed between the LCD panel 210 and the first polarizer 220. The linear polarizing light passing through the first polarizer 220 sequentially passes through the biaxial compensation plate 260, the first a-plate 240, and the first c-plate 270 to perform phase retardation, and then enters into LCD 210. The second a-plate 250 is disposed between the LCD panel 210 and the second polarizer 230, such that the light emitted from the LCD panel 210 passes through the second a-plate 250 to further performing phase compensation, and then is emitted from the second polarizer 230.

It should be noted that the first a-plate 240 and the second a-plate 250 are uniaxial optical compensation film, for example. For instance, the first a-plate 240 and the second a-plate 250 are so-called A-plate, which satisfies a requirement of $n_x \neq n_y \approx n_z$. In detail, $n_x$ is a refractive index along the slow axis direction, i.e. x direction, of the film plane, $n_y$ is a refractive index along the y direction vertical to the x direction of the film plane, and $n_z$ is a refractive index vertical to the film, i.e. z direction, wherein d is a thickness of the film. Moreover, the first a-plate 240 and a second a-plate 250 provide a first phase retardation in planar direction and a second phase retardation in planar direction, respectively. In practice, each of the first phase retardation in planar direction and the second phase retardation in planar direction is substantially 140 nm±50 nm. In this embodiment, each of the first phase retardation in planar direction and the second phase retardation in planar direction is substantially 140 nm.

Furthermore, in this embodiment, as shown in FIG. 2A, the first c-plate 270 is between the LCD panel 210 and the first a-plate 240. The first c-plate 270 is a uniaxial optical compensation film. For instance, the first c-plate 270 is a so-called C-plate, which satisfies a requirement of $n_x \approx n_y \neq n_z$, wherein $n_x$ is a refractive index along the slow axis direction, i.e. x direction, of the film plane, $n_y$ is a refractive index along the y direction vertical to the x direction of the film plane, and $n_z$ is a refractive index vertical to the film, i.e. z direction. The first c-plate provides a first phase retardation in a vertical direction, wherein the first phase retardation in vertical direction is substantially 215 nm±100 nm. In this embodiment, the first phase retardation in vertical direction is substantially 215 nm, for example. It should be noted that the location and number of the first c-plate 270 of the present invention may vary depending on the requirements. Detailed descriptions regarding other types of the first c-plate 270 varying location and number are set forth later in the following embodiments, but the present invention is not limited to these embodiments.

It is noted that, the biaxial compensation plate 260 has a plurality of main axes refractive indexes $n_x$, $n_y$ and $n_z$, wherein the definitions of the $n_x$, $n_y$ and $n_z$ of the biaxial compensation plate 260 are similar to that of the aforementioned a-plate and aforementioned c-plate. Specially, $n_x$ is a refractive index along the slow axis direction, i.e. x direction, of the film plane, $n_y$ is a refractive index along the y direction vertical to the x direction of the film plane, and $n_z$ is a refractive index vertical to the film, i.e. z direction. That is to say, the light propagating in the biaxial compensation plate 260 performs different velocities in different propagating directions of the light transmitted in this plate. Moreover, the main axes refractive indexes $n_x$, $n_y$ and $n_z$ of biaxial compensation plate 260 satisfy the following formula of $Nz=(n_x-n_z)/(n_x-n_y)$, wherein $n_x>n_y$, and $-0.5<N_z<1$. Nz is defined as a ratio between $(n_x-n_z)$ and $(n_x-n_y)$.

More specifically, the biaxial compensation plate 260 can be deemed as a biaxial compensation plate 260 having birefringence characteristics. The phase retardation $R_{in}$ in planar direction providing by the biaxial compensation plate 260 and the phase retardation $R_{th}$ in vertical direction are satisfy the formula (1) and the formula (2), respectively.

$$R_{in}=(n_x-n_y)\times d \qquad (1)$$

$$R_{th}=(n_z-n_y)\times d \qquad (2)$$

Designers may adjust the polarizing direction of images by choosing different phase retardation in vertical direction $R_{th}$ and phase retardation in planar direction $R_{in}$, such that the optical quality of the images displayed by LCD 200 may be enhanced, the dark-state light leakage may be restrained, the viewing angle may be widened, the image color difference may be compensated, and the problem of the color shift may be improved. In addition, designers may adjust the polarizing direction of light by choosing different $n_x-n_z$ and $n_x-n_y$, satisfying the relationship of −0.5<Nz<1, so as to increase luminous flux of the light passing through LCD panel 210.

In this present embodiment, the biaxial compensation plate 260 is disposed between the first polarizer 220 and the first a-plate 240. Certainly, the biaxial compensation plate 260 may also be disposed between the second polarizer 230 and the second a-plate 250, a location P pointed to by an arrow shown as FIG. 2A, but the present invention should not be limited to this.

In practice, when the main axes refractive indexes of the biaxial compensation plate 260 satisfy the relationship of $-0.5<N_z<1$, the phase retardation of the vertical alignment LCD 200 can be efficiently compensated by the certain optical parameters of the biaxial compensation plate 260. Hence, the dark-state light leakage can be efficiently restrained, thus widening the viewable angle of the LCD 200.

Figure 2B:
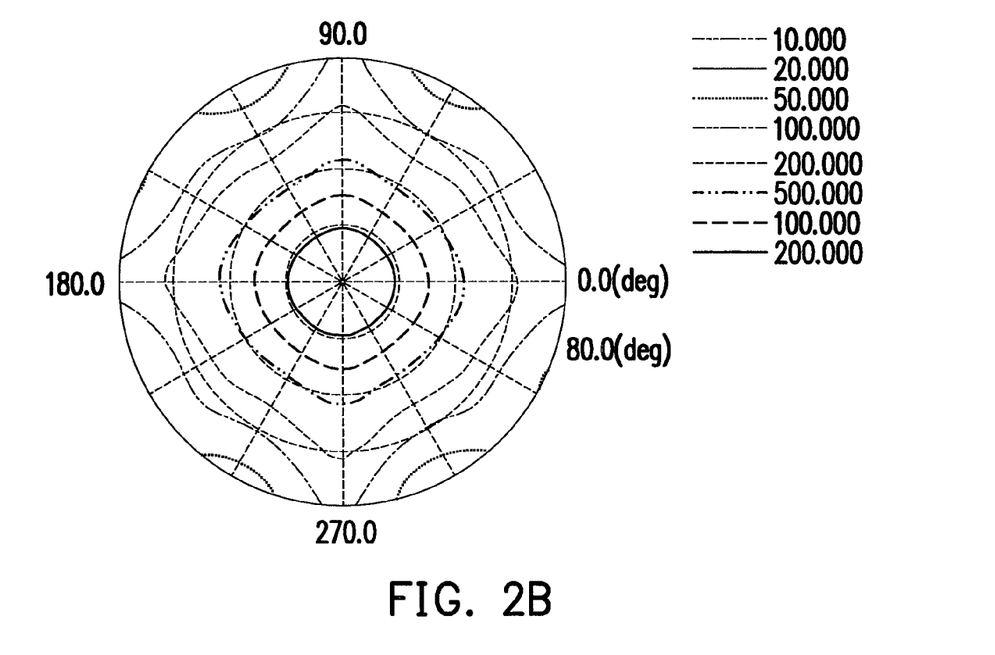
FIG. 2B is a schematic view showing the viewing angle-contrast of the LCD depicted in FIG. 2A.

FIG. 2B is a schematic view showing the viewing angle-contrast of the LCD depicted in FIG. 2A. Referring to FIG. 2B, in this embodiment, the first phase retardation in planar direction and the second phase retardation in planar direction are substantially 140 nm respectively, the first phase retardation in vertical direction is substantially 215 nm, and the phase retardation of vertical alignment liquid crystal layer 216 is substantially 340 nm. The optical parameters of the biaxial compensation plate 260 are designed to cooperate with phase retardations of the foregoing elements. In this present embodiment, the Nz value of the biaxial compensation plate 260 is substantially 0.275, and the phase retardation of the biaxial compensation plate 260 is substantially 170 nm. As shown in FIG. 2B, compared to the viewing angle—contrast of the conventional LCD 100 shown as FIG. 1B, the LCD 200 of the present embodiment not only can efficiently improve the viewing angle of top direction, bottom direction, left and right directions, but also can improve the viewing angle of diagonal direction.

Second Embodiment

Figure 3A:
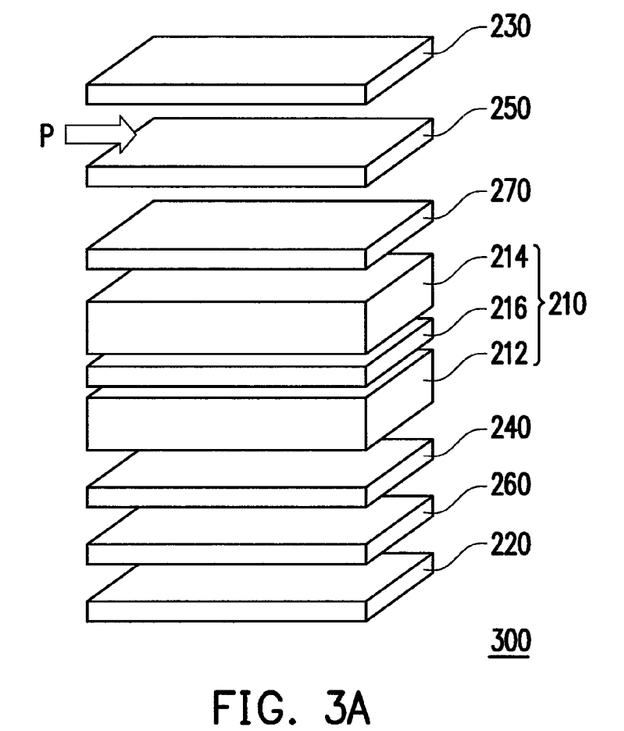
FIG. 3A illustrates a schematic view of a liquid crystal display according to the second embodiment of the present invention.

FIG. 3A illustrates a schematic view of a liquid crystal display according to the second embodiment of the present invention. Referring to FIG. 3A, the LCD 300 is similar to the LCD 200 of the first embodiment, a single c-plate is likewise disposed in the LCD 300. Furthermore, in this embodiment, the first c-plate 270 is individually disposed between the LCD panel 210 and the second a-plate 250. Similarly, the biaxial compensation plate 260 is capable of suppressing the dark-state light leakage phenomenon of the LCD 300, and further widening the viewing angle and improving the optical quality.

Figure 3B:
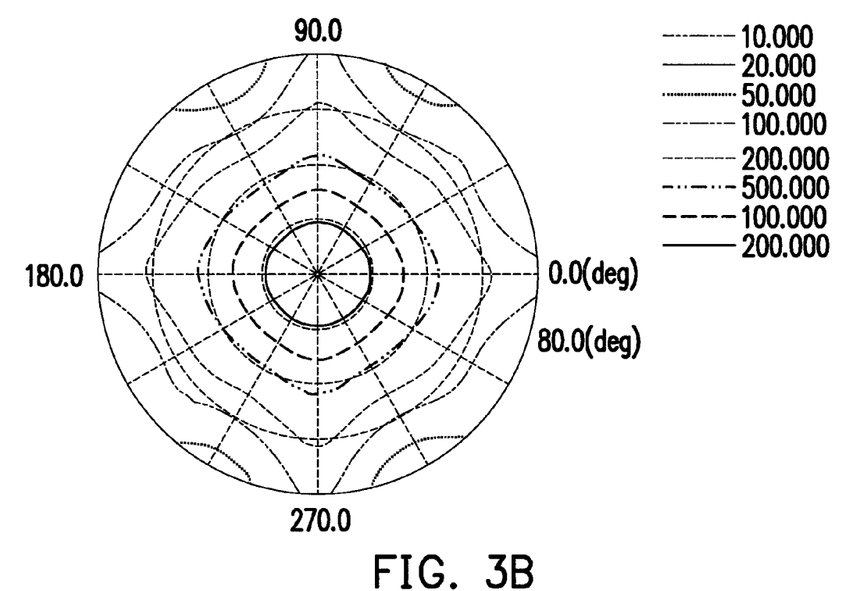
FIG. 3B is a schematic view showing the viewing angle-contrast of the LCD depicted in FIG. 3A.

FIG. 3B is a schematic view showing the viewing angle-contrast of the LCD depicted in FIG. 3A. Referring to FIG. 3B, in this embodiment, the Nz value of the biaxial compensation plate 260 is substantially 0.275, and each of phase retardation of each of the first a-plate 240, the second a-plate 250, the biaxial compensation plate 260 and the first c-plate 270 is similar to the first embodiment. As shown in FIG. 3B, compared to the conventional LCD, the LCD 300 of the present embodiment not only can efficiently improve the viewing angle of top direction, bottom direction, left and right directions, but also can improve the viewing angle of diagonal direction.

The Third Embodiment

Figure 4A:
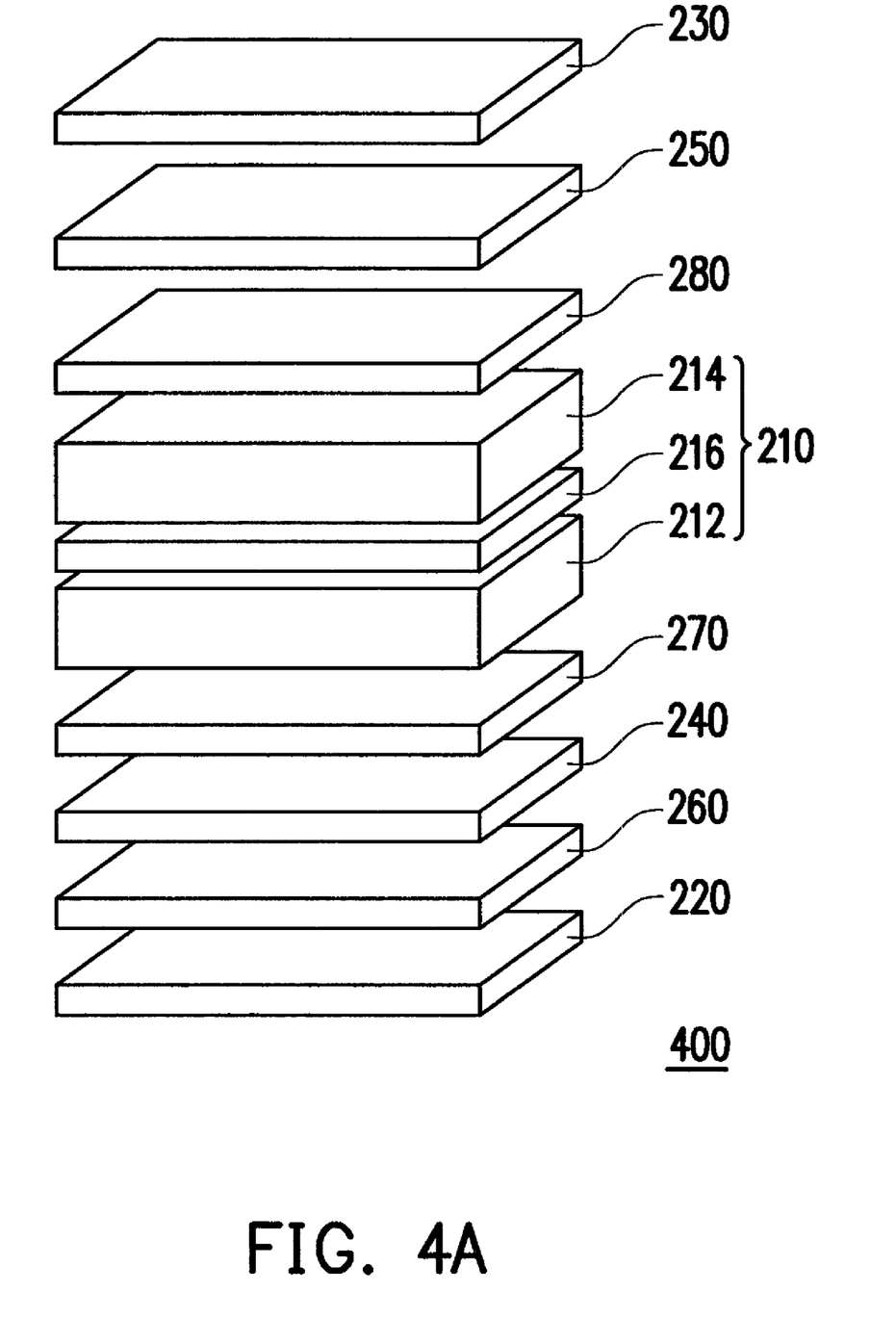
FIG. 4A and FIG. 4B illustrate a schematic view of a liquid crystal display respectively according to the third embodiment of the present invention.
Figure 4B:
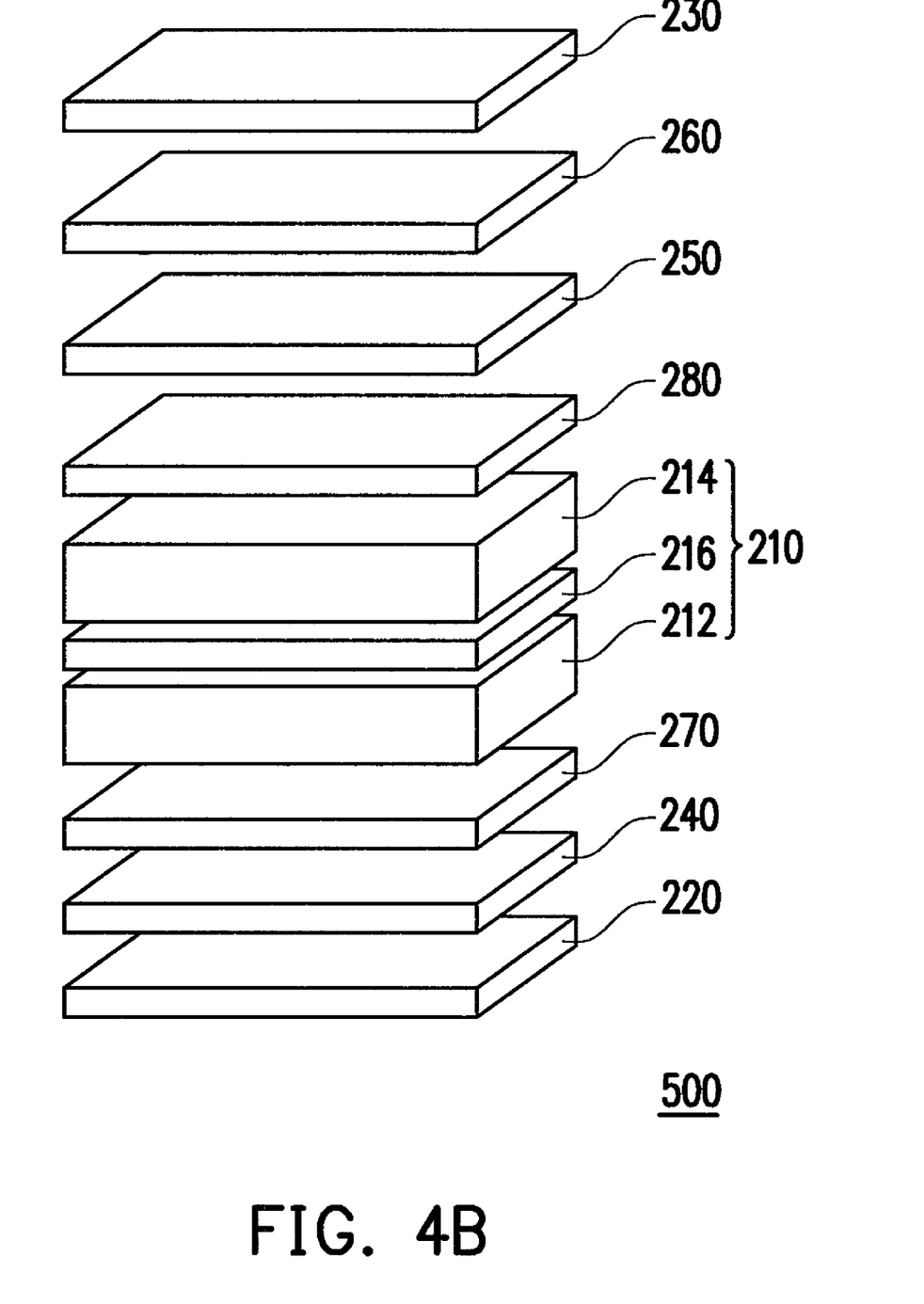

FIG. 4A and FIG. 4B illustrate a schematic view of a liquid crystal display respectively according to the third embodiment of the present invention. Referring to FIGS. 4A and 4B, the LCD 400 and 500 are similar to the LCD 200 of the first embodiment. Furthermore, the LCD 400 and 500 of this embodiment further comprise a second c-plate 280, and the first c-plate 270 and the second c-plate 280 are adjacent to two sides of LCD panel 210 respectively. That is to say, two c-plates 270 and 280 are simultaneously utilized in this embodiment. In detail, the second c-plate 280 is disposed between the LCD panel 210 and the second a-plate 250. The difference between the LCDs shown in FIG. 4A and FIG. 4B is the location of the biaxial compensation plates 260, wherein the biaxial compensation plates 260 of LCD 400 shown in FIG. 4A is disposed between the first polarizer 220 and the first a-plate 240, and the biaxial compensation plates 260 of LCD 500 shown in FIG. 4B is disposed between the second polarizer 230 and the second a-plate 250.

It should be noted that, in this embodiment, a summation of phase retardations provided by the first c-plate 270 and the second c-plate 280 is substantially equal to a phase retardation in vertical direction provided by the first c-plate 270 of the first embodiment or provided by individually utilizing the first c-plate 270. In other words, the summation of phase retardations provided by the first c-plate 270 and the second c-plate 280 is substantially equal to a phase retardation in vertical direction provided by the first c-plate 270 excluded from the second c-plate 280, specifically, the phase retardation in vertical direction provided by the first c-plate 270 of the first embodiment is 215 nm, for instance. In this embodiment, the phase retardation in vertical direction provided by the first c-plate 270 is 107.5 nm, for example, and the phase retardation in vertical direction provided by the second c-plate 280 is 107.5 nm, for example.

In this embodiment, the first phase retardation in planar direction and the second phase retardation in planar direction are substantially 140 nm respectively. The first retardation in vertical direction is substantially 107.5 nm, and the second retardation in vertical direction is substantially 107.5 nm. The phase retardation of the vertical alignment liquid crystal 216 is substantially 340 nm. The optical parameters of the biaxial compensation plate 260 are designed to cooperate with the foregoing elements, in this embodiment, the Nz value of the biaxial compensation plate 260 is substantially 0.275, and the phase retardation of the biaxial compensation plate 260 is substantially 170 nm.

Figure 5A:
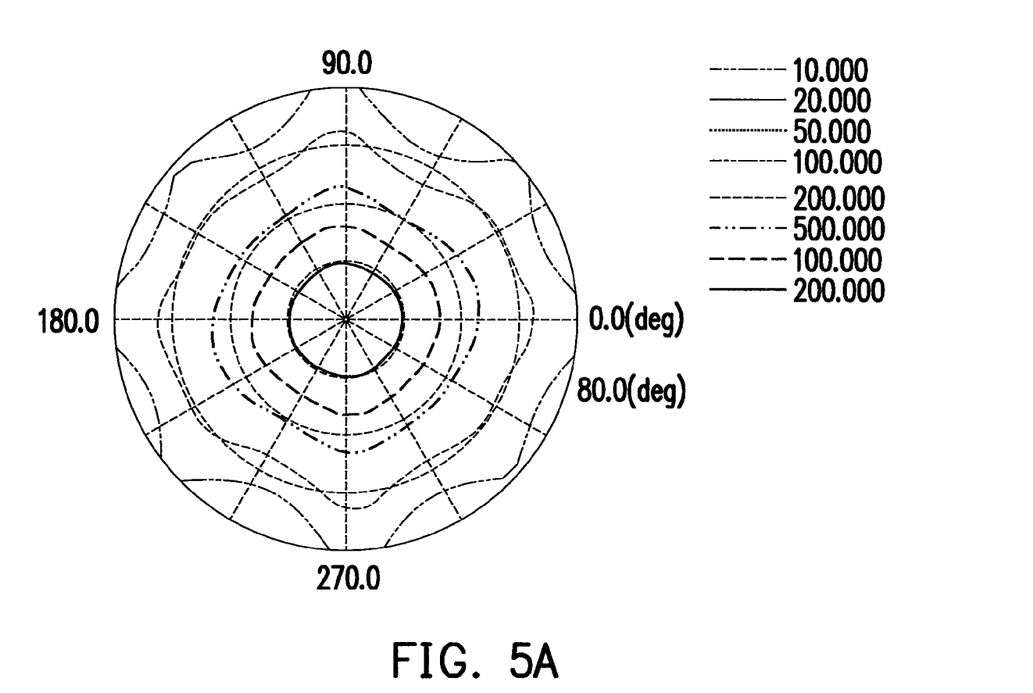
FIG. 5A and FIG. 5B illustrate a schematic view showing the viewing angle-contrast of the LCD respectively depicted in FIG. 4A and FIG. 4B respectively.
Figure 5B:
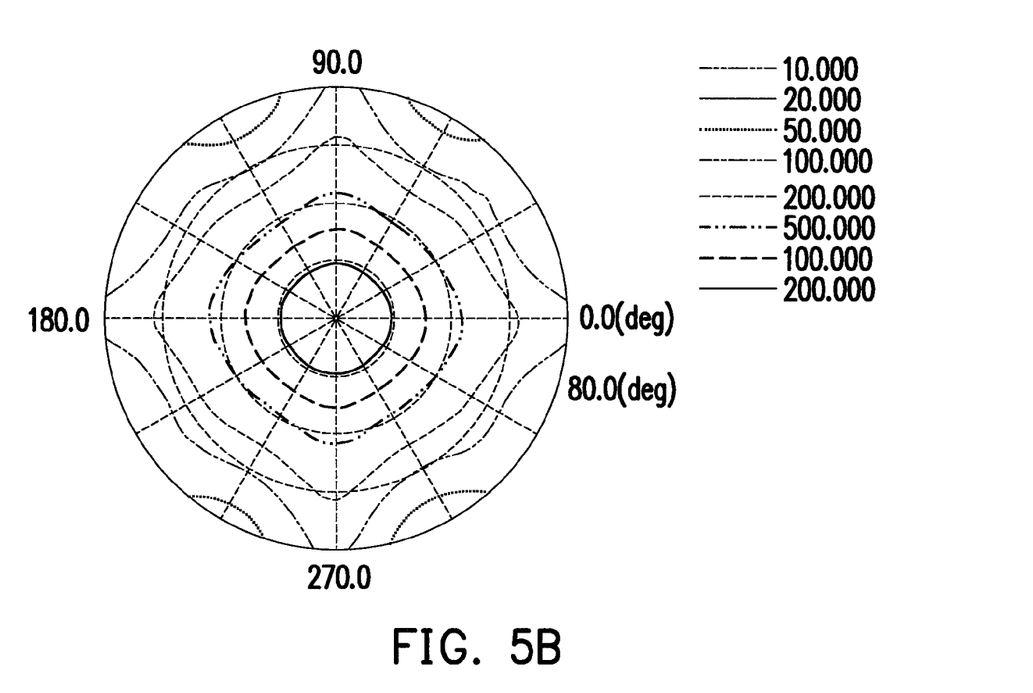

FIG. 5A and FIG. 5B illustrate a schematic view showing the viewing angle-contrast of the LCD respectively depicted in FIG. 4A and FIG. 4B. As shown in FIG. 5A, compared to the conventional LCD, the LCD 400 and 500 of the present embodiment not only can efficiently improve the viewing angle of top direction, bottom direction, left and right directions, but also can improve the viewing angle of diagonal direction.

Figure 6A:
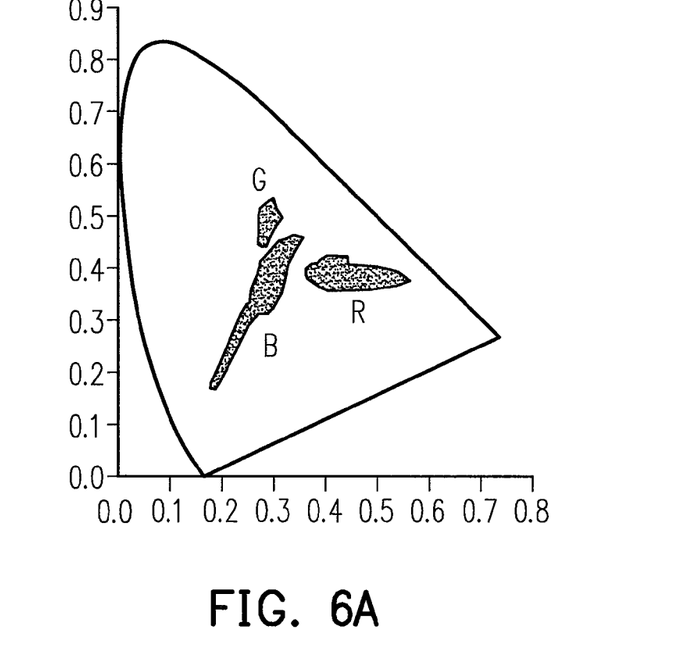
FIG. 6A and FIG. 6B illustrate a schematic view showing an actual measuring chromaticity coordinates in different viewing angles of a conventional LCD and one embodiment of the present invention LCD.
Figure 6B:
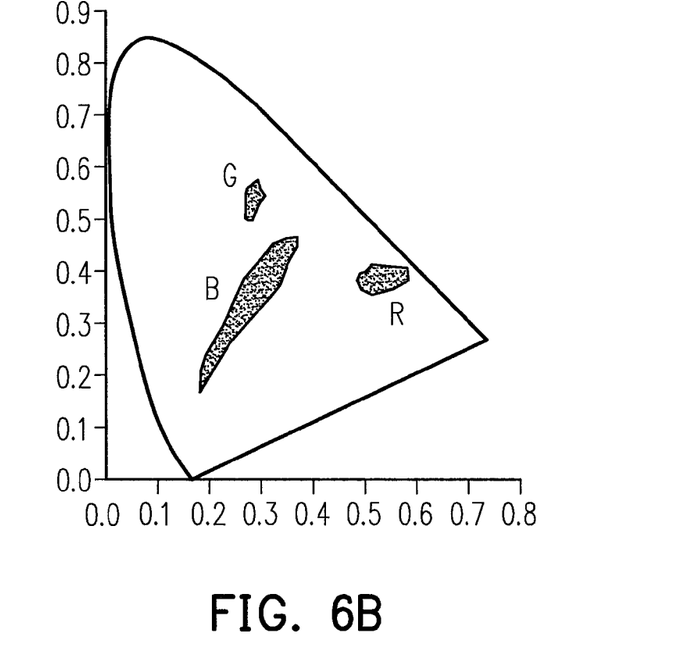

In view of the above, the LCD of the present invention expects widening the viewing angle entirely, it can also provide a remarkable improvement for the color difference phenomenon with a large viewing angle. FIG. 6A and FIG. 6B illustrates a schematic view showing actual measuring chromaticity coordinates in different viewing angles of a conventional LCD and one embodiment of the present invention LCD respectively. As shown in FIG. 6A and FIG. 6B, when viewing the LCD of the present embodiment in different viewing angles, the distribution of the observed red color performance R, the observed green color performance G, and the observed blue color performance B on the chromaticity diagram are more concentrated. Accordingly, the LCD of the present invention can improve when users view the LCD with a large viewing angle.

According to the above descriptions, this invention enhances the optical effect by utilizing a biaxial compensation plate satisfying a certain condition and properly adjusting the polarizing direction of images displayed by the LCD panel. Moreover, compared to the conventional LCD, the LCD of the present invention can efficiently suppress the dark-state light leakage, widen the viewing angle, improving the color difference with large viewing angle, and improve the display quality of the LCD.

Although the present invention has been disclosed by the above embodiments, they are not intended to limit the present invention. Any person having ordinary knowledge in the art may make some modifications and alterations without departing from the spirit and scope of the present invention. Therefore, the scope for which protection is sought by the present invention falls in the appended claims.

What is claimed is:

1. A liquid crystal display, comprising:
a liquid crystal display panel having a vertical alignment liquid crystal layer;
a first polarizer and a second polarizer respectively disposed at two sides of the liquid crystal display panel;
a first a-plate and a second a-plate, wherein the first a-plate is disposed between the liquid crystal display panel and the first polarizer, and the second a-plate is disposed between the liquid crystal display panel and the second polarizer;
a biaxial retardation plate disposed between the first a-plate and the first polarizer or disposed between the second a-plate and the second polarizer, wherein the biaxial retardation plate has a plurality of main axis refractive indexes $n_x$, $n_y$ and $n_z$, and the main axis refractive indexes $n_x$, $n_y$ and $n_z$ satisfy the formula:

$$Nz=(n_x-n_z)/(n_x-n_y)$$

wherein $n_x > n_y$, and $-0.5 < Nz < 1$; and
a first c-plate disposed between the liquid crystal display panel and the first a-plate or disposed between the liquid crystal display panel and the second a-plate.

2. The liquid crystal display of claim 1, wherein the first c-plate provides a first phase retardation in vertical direction, and the first phase retardation in vertical direction is substantially 215 nm±100 nm.

3. The liquid crystal display of claim 1, further comprising a second c-plate, wherein the first c-plate and the second c-plate are respectively adjacent to two sides of the liquid crystal display panel.

4. The liquid crystal display of claim 3, wherein the first c-plate provides a first phase retardation in vertical direction, the second c-plate provides a second phase retardation in vertical direction, each of the first phase retardation in vertical direction and the second phase retardation in vertical direction is substantially 107.5 nm±50 nm.

5. The liquid crystal display of claim 1, wherein the first a-plate provides a first phase retardation in planar direction, the second a-plate provides a second phase retardation in planar direction, each of the first phase retardation in planar direction and the second phase retardation in planar direction is substantially 140 nm±50 nm.

6. The liquid crystal display of claim 1, wherein each of the first a-plate and the second a-plate is a uniaxial optical compensation film.

7. The liquid crystal display of claim 1, wherein the Nz is substantially 0.275.

8. The liquid crystal display of claim 1, wherein the biaxial compensation plate provides a phase retardation in vertical direction and a phase retardation in planar direction.

9. The liquid crystal display of claim 8, wherein the phase retardation in planar direction $R_{in}$ provided by the biaxial compensation plate satisfies the relationship of $R_{in}=(n_x-n_y)\times d$, wherein d is a thickness of the biaxial compensation plate, and the phase retardation in planar direction $R_{in}$ is substantially 170 nm±100 nm.

10. The liquid crystal display of claim 1, wherein a phase retardation of the vertical alignment liquid crystal layer is substantially 340 nm±100 nm.

* * * * *